United States Patent
Tran et al.

(10) Patent No.: US 10,100,158 B2
(45) Date of Patent: Oct. 16, 2018

(54) PROCESS FOR PRODUCING PELLETS OF SOFT COPOLYMERS

(71) Applicant: BOREALIS AG, Vienna (AT)

(72) Inventors: Anh Tuan Tran, Linz (AT); Sameer Vijay, Linz (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 15/506,333

(22) PCT Filed: Nov. 19, 2015

(86) PCT No.: PCT/EP2015/077098
§ 371 (c)(1),
(2) Date: Feb. 24, 2017

(87) PCT Pub. No.: WO2016/079237
PCT Pub. Date: May 26, 2016

(65) Prior Publication Data
US 2017/0283562 A1 Oct. 5, 2017

(30) Foreign Application Priority Data

Nov. 21, 2014 (EP) .................................... 14194255

(51) Int. Cl.
| | | |
|---|---|---|
| *C08J 3/12* | (2006.01) | |
| *B29B 9/06* | (2006.01) | |
| *B01J 2/30* | (2006.01) | |
| B29K 23/00 | (2006.01) | |
| B29K 105/00 | (2006.01) | |
| B29K 509/08 | (2006.01) | |

(52) U.S. Cl.
CPC .............. *C08J 3/124* (2013.01); *B29B 9/065* (2013.01); *B29K 2023/08* (2013.01); *B29K 2105/0094* (2013.01); *B29K 2509/08* (2013.01); *B29K 2995/0063* (2013.01); *C08J 2323/00* (2013.01); *C08J 2323/08* (2013.01)

(58) Field of Classification Search
None
See application file for complete search history.

(56) References Cited

U.S. PATENT DOCUMENTS

| 4,769,289 A | 9/1988 | Kelly et al. | |
|---|---|---|---|
| 7,211,615 B2 * | 5/2007 | Baumann | A61K 8/88 |
| | | | 264/126 |
| 2013/0317193 A1 | 11/2013 | Desai et al. | |

FOREIGN PATENT DOCUMENTS

| EP | 0 410 914 A1 | 1/1991 |
|---|---|---|
| JP | 2000 043039 | 2/2000 |
| JP | 2001 294842 | 10/2001 |

OTHER PUBLICATIONS

International Search Report and Written Opinion for International Application No. PCT/EP2015/077098 dated Feb. 25, 2016.

* cited by examiner

*Primary Examiner* — Mary Lynn F Theisen
(74) *Attorney, Agent, or Firm* — Fay Sharpe LLP

(57) ABSTRACT

The present invention deals with a process for producing pellets from olefin copolymers. The process comprises: (i) melting the olefin copolymer in an extruder; (ii) extruding the molten olefin copolymer through a die plate into a pellet water bath in a pelletizer thereby producing strands of the olefin copolymer; (iii) cutting the strands of the olefin copolymer in the pelletizer into pellets; and (iv) drying the pellets. The pellet water in the pelletizer contains from 0.1 to 5% by weight of a colloidal silica based on the weight of the water.

12 Claims, 4 Drawing Sheets

PROCESS FOR PRODUCING PELLETS OF SOFT COPOLYMERS

This application is a 371 of PCT Application Serial No. PCT/EP2015/077098, filed Nov. 19, 2015, which claims priority to European Patent Application Serial No. 14194255.7, filed Nov. 21, 2014.

FIELD OF THE INVENTION

The present invention is directed to a method of pelletising olefin copolymers. Especially, the present invention is directed to a method of pelletising olefin copolymers in underwater pelletisation. The present method improves the flow properties of the resulting olefin copolymer pellets.

PROBLEM TO BE SOLVED

Certain olefin copolymers, such as polyolefin elastomers and plastomers, for instance polyethylenes having a density of 915 kg/m$^3$ or less, down to 856 kg/m$^3$, and propylene copolymers having a fraction of xylene soluble polymer at 25° C. of at least 25% and up to 60% or even more, have a problem that the pellets made of the polymer tend to adhere to each other during the transport and storage. This often causes problems in downstream process steps, such as blending, storage and packaging.

EP-A-1132435 discloses coating compositions comprising finely divided silicic acid with large BET surface. The powdery composition was dispersed, for instance, in water. The coatings could be applied to various substrates, such as metal substrates, like automotive bodies.

EP-A-2277941 discloses that the flowability of pellets made of a sticky polymer could be improved by adding a binder to the pellets and tumbling the pellets with an antiblock. The antiblock could be, for instance, siloxane which was used in an amount of 0.2% by weight.

US-A-2001/00124607 discloses that pellets made of a sticky polymer were dusted with an antiblock composition in water suspension. Exemplified antiblock compositions were polyethylene, calcium stearate and bisstearamide wax. The pellets and antiblock agent were contacted at temperatures of at least 25° C.

WO-A-2012/131458 discloses that an antiblock agent was added in an amount of from 1 to 15% by weight into pellets made from elastomeric polymers. The antiblock was inorganic filler, such as magnesium sulphate, titanium hydroxide, calcium hydroxide, silica and others. The examples disclosed the addition of the antiblocking agent into the extruder. FIG. 1 discloses the addition of the antiblock into the dewatering step when the elastomer is recovered from the polymerisation reactor.

U.S. Pat. No. 4,769,289 discloses a process where a polar copolymer of ethylene interpolymer was surface coated by fumed silica having a particle size between 5 and 25 nm. The fumed silica could be added into the pellet water in an amount of 0.1 to 10%, preferably from 0.8 to 1.1%. The pH of the dispersion was suitably from 10 to 12.

JP-A-2000043039 discloses a process where a block copolymer of a conjugated diene and an aromatic vinyl polymer was surface coated with a particulate additive being a mixture of silica and talc. Silica was reported to have an average particle size of from 500 nm to 300 μm. The additive was dispersed in the pellet water.

US-20130317193 discloses a method where pellets of an adhesive (propylene-butylene copolymer) were surface coated with a particulate additive. The adhesive was pelletised under water containing the particulate additive after which the pellets were passed to a recrystallization tank where they were further contacted with the particulate additive and allowed to recrystallize for 120 minutes. The particulate additive could be talc, mica, calcium carbonate, silica, organic polymer such as polyethylene, and the like.

EP-A-410914 discloses a process where sticky polymers, such as polyolefin elastomers, were treated with antiblocking additive by extruding the polymer through a die plate to a cooling fluid, cutting the polymer to pellets in the cooling fluid, separating the pellets from the cooling fluid and contacting the pellets with an antiblocking additive. The antiblocking additive could be a powder, silicone or surfactant and was preferably a powdered polyolefin.

In spite of the above-mentioned disclosures there still remains a need for a simple and economical process which overcomes the problem of agglomeration of pellets during the transport and storage. Especially, even though the prior art suggests using antiblock agents in polyolefin pellets, they are normally used together with a binder, like in EP-A-2277941, which leads to a complicated process. The present invention provides a simple and economical process where silica is homogeneously distributed on the surface of the pellets thereby improving their handling properties.

SUMMARY OF THE INVENTION

As seen from one aspect the present invention provides a process for producing pellets from olefin copolymers comprising the steps of: (i) melting the olefin copolymer in an extruder; (ii) extruding the molten olefin copolymer through a die plate having a multitude of holes into a pellet water bath in a pelletiser thereby producing strands of the olefin copolymer and solidifying the strands; (iii) cutting the strands of the olefin copolymer in the pelletiser into pellets; and (iv) drying the pellets, characterised in that the pellet water in the pelletiser contains from 0.5 to 6.0% by weight of a colloidal silica based on the weight of the water wherein the colloidal silica has a particle size of from 30 to 200 nm and the pH of the pellet water is adjusted within the range of from 6 to 10.

As seen from another aspect the present invention provides the use of colloidal silica in the pellet water for improving the flow properties of olefin copolymer pellets, the use comprising the steps of (i) melting the olefin copolymer in an extruder; (ii) extruding the molten olefin copolymer through a die plate having a multitude of holes into a pellet water bath in a pelletiser thereby producing strands of the olefin copolymer and solidifying the strands; (iii) cutting the strands of the olefin copolymer in the pelletiser into pellets; and (iv) drying the pellets, wherein the pellet water contains from 0.5 to 6.0% by weight of a colloidal silica having a particle size of from 30 to 200 nm, based on the weight of the water, and the pH of the pellet water is adjusted within the range of from 6 to 10.

The present invention offers a simple and economical process which effectively improves the flow properties of the pellets.

DETAILED DESCRIPTION

The Olefin Copolymer

Figure 1:
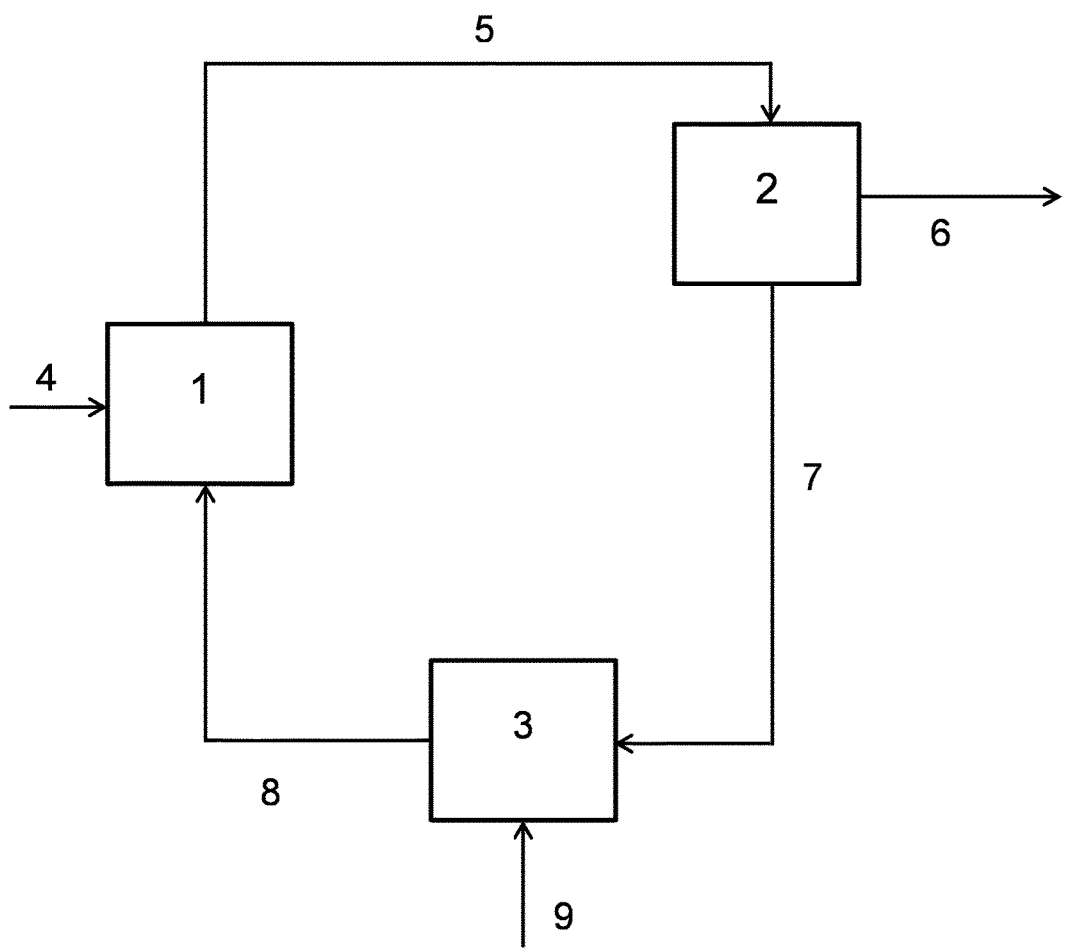
FIG. 1 shows a flow diagram of a pelletisation process where the present invention can be conducted.

The present method involves the production of copolymers of olefins. Such copolymers comprise an olefin monomer and at least one comonomer.

The olefin monomer can be any alpha-olefin monomer. Preferably the olefin monomer is an alpha-olefin having from 2 to 10 carbon atoms, more preferably from 2 to 8 carbon atoms. Especially preferably the olefin monomer is ethylene, propylene, 1-butene or 4-methyl-1-pentene and in particular ethylene or propylene. The olefin copolymer comprises at least 50% by mole of units derived from the olefin monomer, based on all the monomeric units in the copolymer. Preferably, the olefin copolymer comprises from 70 to 95% by mole, more preferably from 80 to 95% by mole of units derived from the olefin monomer, based on all the monomeric units in the copolymer.

The comonomer can be an alpha-olefin comonomer. Then it is preferably an alpha-olefin having from 2 to 10 carbon atoms and which is different from the olefin monomer. More preferably the comonomer is then an alpha-olefin having from 2 to 8 carbon atoms and which is different from the olefin monomer. If the olefin monomer is ethylene then the alpha-olefin is especially preferably selected from the group consisting of 1-butene, 1-hexene, 1-octene and mixtures thereof. If the olefin is propylene then the alpha-olefin is especially preferably selected from the group consisting of ethylene, 1-butene, 1-hexene, 1-octene and mixtures thereof.

The comonomer can also be a polyene, such as a diene or a triene. Suitable examples of polyene comonomers are 7-methyl-1,6-octadiene, 1,7-octadiene, 1,9-decadiene, 1,5-hexadiene, and 5-vinyl-2-norbornene.

The comonomer may also be a cyclic olefin such as norbornene, dihydro-dicyclopentadiene, phenyl norbornene or etracyclododecene.

In addition, the comonomer can be a mixture of two or more of the above-described compounds.

The olefin copolymer can be produced in the presence of a polymerisation catalyst in any suitable polymerisation process, such as slurry, gas phase or solution.

If the olefin monomer is ethylene, then it is especially preferred to produce the olefin copolymer in solution polymerisation process. In such process the polymerisation is conducted at a temperature which is greater than the melting temperature of the polymer. Typically the polymerisation is conducted at a temperature of from about 115° C. to 180° C., such as 118 to 140° C., depending on the melting temperature of the polymer being produced. The pressure is typically from 1 to 200 bar. Such processes are disclosed, among others, in WO-A-1997/036942, WO-A-2006/083515, WO-A-2008/082511, and WO-A-2009/080710.

It is also possible to conduct the polymerisation in slurry. When the polymerisation is conducted in slurry the polymer particles formed in the polymerisation, together with the catalyst fragmented and dispersed within the particles, are suspended in the fluid hydrocarbon. The slurry is agitated to enable the transfer of reactants from the fluid into the particles.

The temperature in the slurry polymerisation is typically from 50 to 110° C., preferably from 60 to 100° C. and in particular from 65 to 95° C. The pressure is from 1 to 150 bar, preferably from 10 to 100 bar.

The slurry polymerisation may be conducted in any known reactor used for slurry polymerisation. Such reactors include a continuous stirred tank reactor and a loop reactor. It is especially preferred to conduct the polymerisation in loop reactor. In such reactors the slurry is circulated with a high velocity along a closed pipe by using a circulation pump. Loop reactors are generally known in the art and examples are given, for instance, in U.S. Pat. No. 4,582,816, U.S. Pat. No. 3,405,109, U.S. Pat. No. 3,324,093, EP-A-479186 and U.S. Pat. No. 5,391,654.

When the polymerisation is conducted in gas phase it may be conducted in a fluidised bed reactor, in a fast fluidised bed reactor or in a settled bed reactor or in any combination of these. Preferably, the polymerisation is conducted in a fluidised bed reactor. In a fluidised bed gas phase reactor propylene is copolymerised in the presence of the polymerisation catalyst in an upwards moving gas stream. The reactor typically contains a fluidised bed comprising the growing polymer particles containing the active catalyst located above a fluidisation grid.

The polymer bed is fluidised with the help of the fluidisation gas comprising propylene, comonomer(s), eventual chain growth controllers or chain transfer agents, such as hydrogen, and eventual inert gas. The fluidisation gas is introduced into an inlet chamber at the bottom of the reactor. To make sure that the gas flow is uniformly distributed over the cross-sectional surface area of the inlet chamber the inlet pipe may be equipped with a flow dividing element as known in the art, e.g. U.S. Pat. No. 4,933,149 and EP-A-684871. One or more of the above-mentioned components may be continuously added into the fluidisation gas to compensate for losses caused, among other, by reaction or product withdrawal.

From the inlet chamber the gas flow is passed upwards through the fluidisation grid into the fluidised bed. The purpose of the fluidisation grid is to divide the gas flow evenly through the cross-sectional area of the bed. Sometimes the fluidisation grid may be arranged to establish a gas stream to sweep along the reactor walls, as disclosed in WO-A-2005/087361. Other types of fluidisation grids are disclosed, among others, in U.S. Pat. No. 4,578,879, EP 600414 and EP-A-721798. An overview is given in Geldart and Bayens: The Design of Distributors for Gas-fluidised Beds, Powder Technology, Vol. 42, 1985.

The fluidisation gas passes through the fluidised bed. The superficial velocity of the fluidisation gas must be higher that minimum fluidisation velocity of the particles contained in the fluidised bed, as otherwise no fluidisation would occur. On the other hand, the velocity of the gas should be lower than the onset velocity of pneumatic transport, as otherwise the whole bed would be entrained with the fluidisation gas. The minimum fluidisation velocity and the onset velocity of pneumatic transport can be calculated when the particle characteristics are known by using common engineering practise. An overview is given, among others in Geldart: Gas Fluidisation Technology, J. Wiley & Sons, 1986.

Typically the fluidised bed polymerisation reactor is operated at a temperature within the range of from 50 to 100° C., preferably from 65 to 90° C. The pressure is suitably from 10 to 40 bar, preferably from 15 to 30 bar.

The polymerisation catalyst may be any polymerisation catalyst being capable of producing the copolymer of olefin. Suitable catalysts are metallocene catalysts and Ziegler-Natta catalysts. Very useful catalysts in this respect are the metallocene catalysts having a ligand with a cyclopentadienyl structure, such as substituted or unsubstituted cyclopentadienyl, substituted or unsubstituted indenyl, substituted or unsubstituted tetrahydroindenyl and substituted or unsubstituted fluorenyl, connected to a transition metal atom, such as titanium, zirconium or hafnium atom. Suitable catalysts are disclosed, among others, in WO-A-87/07620, WO-A-92/21705, WO-A-93/11165, WO-A-93/11166, WO-A-93/19100, WO-A-97/36939, WO-A-98/12234, WO-A-99/33842, WO-A-03/000756, WO-A-03/000757, WO-A-03/000754, WO-A-03/000755, WO-A-2004/029112, EP-A-2610271, WO-A-2012/007430, WO-A-92/19659, WO-A-92/19653, WO-A-92/19658, U.S. Pat. No. 4,382,019, U.S. Pat. No. 4,435,550, U.S. Pat. No. 4,465,782, U.S. Pat. No. 4,473,660, U.S. Pat. No. 4,560,671, U.S. Pat. No. 5,539,067, U.S. Pat. No. 5,618,771, EP-A-45975, EP-A-45976, EP-A-45977, WO-A-95/32994, U.S. Pat. No. 4,107,414, U.S. Pat. No. 4,186,107, U.S. Pat. No. 4,226,963, U.S. Pat. No. 4,347,160, U.S. Pat. No. 4,472,524, U.S. Pat. No. 4,522,930, U.S. Pat. No. 4,530,912, U.S. Pat. No. 4,532,313, U.S. Pat. No. 4,657,882, U.S. Pat. No. 4,581,342, U.S. Pat. No. 4,657,882, EP-A-629631, EP-A-629632, WO-A-00/26266, WO-A-02/002576, WO-A-02/002575, WO-A-99/12943, WO-A-98/40331, EP-A-776913, EP-A-1074557, WO-A-99/42497, WO-A-95/12622, WO-A-96/32423, WO-A-97/28170, WO-A-98/32776, WO-A-99/61489, WO-A-03/010208, WO-A-03/051934, WO-A-03/051514, WO-A-2004/085499, EP-A-1752462 and EP-A-1739103.

The polymerisation of the olefin copolymers is well known to the person skilled in the art, including the polymerisation processes and the catalysts used in them. Especially, the person skilled in the art is capable of controlling the density or comonomer content of the polymer by suitable addition of the comonomer and the molecular weight or the melt index by suitable addition of hydrogen.

It has been found that the process of the present invention is especially effective in improving the flow properties pellets made of copolymers of ethylene with alpha-olefins having from 4 to 10 carbon atoms and where the ethylene copolymer has a density of from 856 to 915 kg/m$^3$, preferably from 860 to 910 kg/m$^3$. Furthermore, such ethylene copolymers have typically MFR$_2$ of from 0.2 to 50 g/10 min, preferably from 0.3 to 30 g/10 min.

Extrusion and Pelletisation

After the polymer is recovered from the polymerisation process it is degassed, mixed with additives and extruded as it is well known in the art. The extrusion is preferably conducted in a twin screw extruder. Suitable twin screw extruders are co-rotating twin screw extruders and counter-rotating twin screw extruders. Co-rotating twin screw extruders are manufactured, among others, by Coperion, KraussMaffei Berstorff and Japan Steel Works. Counter-rotating extruders are manufactured, among others, by Farrel, Kobe Industries and Japan Steel Works. The twin screw extruders and their operation are within the skill of the person skilled in the art.

The extruder typically comprises one or more feed ports into which the olefin copolymer is introduced. Downstream of the feed port there is a melting zone and downstream of the melting zone one or more mixing zones. At the end of the extruder there is a die plate having a plurality of openings through which the molten plastic is extruded. The extruder may further comprise a screen pack with one or more screens for removing impurities or inhomogeneities. It may further comprise one or more gear pumps for generating sufficient pressure.

One or more conventional additives for improving the performance of the olefin copolymer in the conversion process and end-use applications are added before or at the extrusion stage. Typically the additives are introduced into the feed port of the extruder together with the olefin copolymer. The conventional additives include antioxidants and process stabilisers, UV-stabilisers, slip agents, antiblocking agents, acid scavengers and nucleating agents. However, in the present invention no binding agent is needed for binding the silica particles to the pellets. Therefore the conventional additives are preferably not understood to include any binding agent for improving the incorporation of silica particles to the pellets.

According to the method of the present invention the olefin copolymer is extruded through a plurality of openings in the die plate into strands. After exiting the hole in the die plate the strand comes into contact with the water in the pelletiser and is thereby cooled and solidified. The strand is then cut to pellets, typically by a number of rotating knives mounted close to the die plate. Usually the knives are mounted at the die plate so that the blade of the knife is in contact with the die plate. When the pellet is cut loose from the strand it is carried away with the pellet water stream and thereby further cooled.

The temperature of the pellet water in the pelletiser is typically from 10 to 90° C., preferably from 10 to 60° C., even more preferably from 10 to 40° C., especially preferably from 12 to 25° C. and especially preferably from 12 to 20° C. The pressure is not critical and can be selected based on the needs, such as from 1 to 10 bar (absolute pressure).

In the present method the pellet water contains colloidal silica so that the content of the colloidal silica is from 0.5 to 6% by weight of colloidal silica based on the weight of the water. Preferably the thus defined amount of colloidal silica is from 0.5 to 3.0% by weight and even more preferably from 0.6 to 1.5% by weight. The colloidal silica is preferably added to the pellet water upstream of the pelletiser.

The text of the present application refers to "pellet water". The term "pellet water" is to be understood as the mixture of water and the colloidal silica where colloidal silica has been added to the water. Furthermore, as the colloidal silica is dispersed in a liquid, the "pellet water" also includes the eventual carrier liquid of the colloidal silica. Where the term "pellet slurry" is used, it is to be understood as the slurry comprising the pellet water (including the colloidal silica) and the polyolefin pellets. Where a reference to pure water is made then the term "water" is used.

The text of the present application refers to the content of the colloidal silica in the pellet water. Such defined content of colloidal silica is to be understood as the content of "dry" silica, not including the carrier liquid in which the colloidal silica was dispersed. The amount of the carrier liquid is included in the total amount of the "pellet water", however.

The weight ratio of pellets to water is typically from 0.1/100 to 5/100, preferably from 0.2/100 to 2/100. For instance, ratios within the range of from 0.25/100 to 1/100 have given good results.

Furthermore, the weight ratio of silica to water is from 0.5/100 to 6/100, preferably from 0.5/100 to 3/100 and more preferably from 0.6/100 to 1.5/100. Then the weight ratio of silica in the pellet water to pellets is from 1/10 to 60/1, preferably from 1/4 to 15/1 and even more preferably from 3/5 to 3/1.

Suitable colloidal silica is available in the market by several companies. For instance Akzo Nobel, Nalco, Sigma-Aldrich, Klebosol, Evonik, Nyacol, Cabot and Grace supply colloidal silica. In colloidal silica the silica particles are suspended in a liquid. Typically the liquid is electrostatically stabilised so that the particles remain suspended in solution. The size of the silica particles is typically from 30 to 200 nm, preferably from 30 to 100 nm. Usually the pH of the suspension is adjusted for a specific particle size. Colloidal silicas and their preparation are well known in the industry.

The pH of the pellet water is advantageously maintained at neutral or slightly basic level. Thus, it is often advantageous to maintain the pH of the pellet water within the range of from 6 to 10, preferably from 7 to 10 and more preferably from 8 to 10. Maintaining the pH within this range usually prevents the silica particles from agglomerating and coagulating. However, the actual pH value depends on the nature of the silica and for some silicas a more acidic pH may be preferred. As it is well known in the chemical industry, the pH may be adjusted by adding a base or an acid into the pellet water. Also buffer solutions exist which may be used for more accurate control of the pH.

After cutting the pellets are suspended in the pelletiser in the mixture of water and colloidal silica. They are carried away with the pellet water stream from the pelletiser and are simultaneously cooled. The pellet water stream is passed to a dryer where the pellets are removed from the water stream. The pellet water stream entering the pelletiser is adjusted so that the residence time in the piping from the pelletiser to the dryer, including the pelletiser, is within the desired limits. For instance, residence time within the range of from 5 to 120 seconds, preferably from 5 to 100 seconds and more preferably from 7 to 60 seconds has given good results.

One suitable way of removing the pellets from the pellet water is by using a spin dryer. There the pellet slurry is put into a rotating motion. The liquid is pressed through a screen at the outer periphery of the rotating dryer while the pellets are trapped inside.

The present invention improves the flow of polymer pellets. It should be understood that even though the flow of the pellets treated according to the method of the present invention is improved compared with untreated pellets, the flow may anyway become poor if the pellets are stored for a long period close to or above the softening temperature of the polymer. It is therefore preferred to store the pellets below the softening temperature of the polymer. Therefore, preferably the pellets are stored at a temperature which is not greater than the Vicat softening temperature of the olefin copolymer. More preferably, the storage temperature is at least 4° C. lower than the Vicat softening temperature of the olefin copolymer.

The inventors have found that when colloidal silica is added to the pellet water a portion of the silica particles is incorporated onto the surface of the pellets. Furthermore, the silica particles are evenly distributed onto the pellet surfaces. Thereby the adhesion and agglomeration tendency of the pellets is substantially reduced. Silica also adheres to the pellets without any binding agent. The pellets behave well during transport and storage, and time needed, for instance, for packaging and shipping operations is greatly reduced. Additionally, the pelletisation process itself is improved and especially the amount of multiples, such as double pellets, is reduced. Furthermore, the process is simple as it can be conducted in existing apparatus without a need for further investment.

Typically, the amount of silica which has adhered to the polymer pellets is from about 50 ppm to about 1000 ppm based on the weight of the olefin copolymer, preferably from about 50 ppm to about 500 ppm and especially from about 50 ppm to about 300 ppm, based on the weight of the olefin copolymer.

FIG. 1 is a representation of a typical post-extrusion process where the present method can be used.

The polymer melt is passed from the extruder (4) through a die plate into the pelletiser (1) and is cut to pellets. The pellet water is passed along the line (8) from the pellet water tank (3) into the pelletiser (1). Additional water and colloidal silica is added to the pellet water tank (3) along the make-up feed line (9) to compensate for consumed and lost materials. Water and colloidal silica are added into the pellet water tank (3) so that the pellet water passed to the pelletiser (1) has the desired content of colloidal silica. As discussed above, the content of colloidal silica is from 0.5 to 6% by weight of colloidal silica based on the weight of the water. Preferably the thus defined amount of colloidal silica is from 0.5 to 3.0% by weight and even more preferably from 0.6 to 1.5% by weight of the water.

The pellet slurry stream carries the pellets along the line (5) into the drier (2). As discussed above, the drier (2) is suitably a spin dryer. In the drier (2) the pellets are separated from the pellet water stream and collected along the line (6) after which they are sent to storage and packaging. The pellet water from the dryer (2) is collected along the line (7) and recycled to the pellet water tank (3).

Suitably the pellet water is cooled in a heat exchanger (not shown) while being passed from the pellet water tank (3) into the pelletiser (1). In this way the heat transferred from the pellets to the pellet water can be removed.

In addition the equipment may contain devices for adding further components into the pellet water and for pressurising and isolating parts of the equipment, such as pumps and valves, as well as sensors, controllers and such.

All this process apparatus exists in a conventional pelletising process. The present method can thus be conducted in existing equipment.

Figure 2:
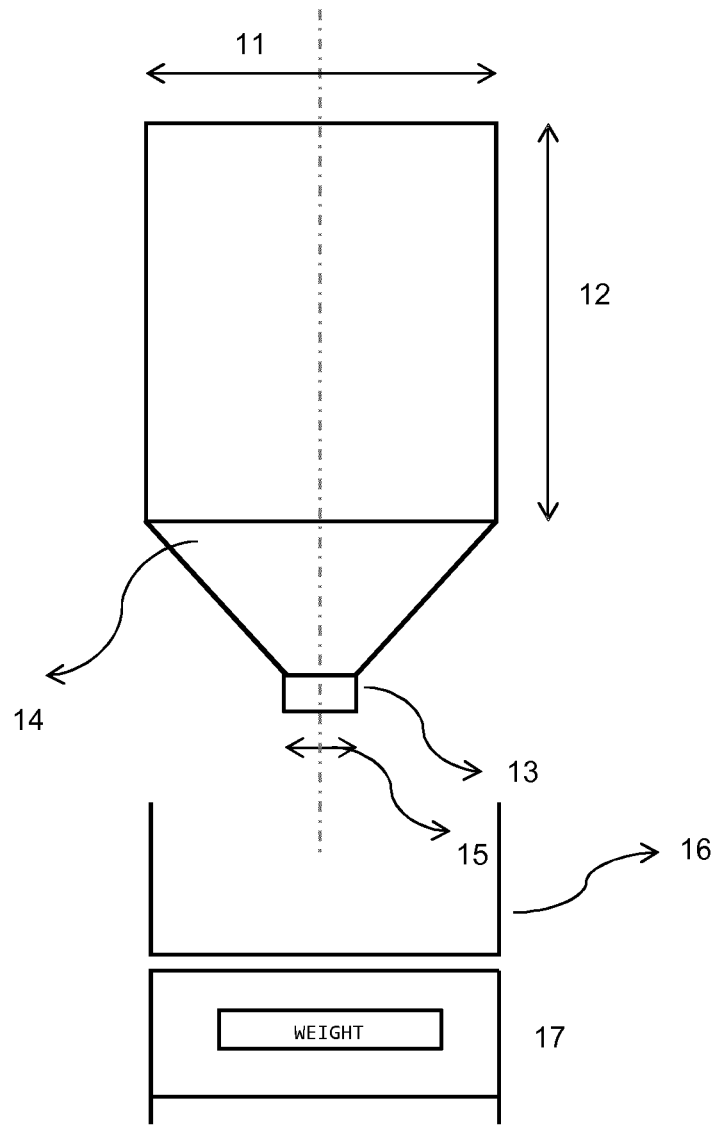
FIG. 2 shows a drawing of a silo where the flow experiments were made.

FIG. 2 is a representation of the silo where the pellet flow measurements were made. The main body of the silo had a diameter (11) of 300 mm and a height (12) of 350 mm. The conical part (14) had an angle between the side of the cone and the horizontal plane of 50°. At the bottom of the cone there was an opening having the shape of a cylinder (13) where the diameter (15) of the cylindrical opening (13) was 50 mm.

The pellets were withdrawn from the silo into a container (16) standing on a balance (17) from where a continuous weight reading was collected. This allowed monitoring the emptying rate of the silo.

DESCRIPTION OF METHODS

Melt Flow Rate

Melt flow rate (MFR) was determined according to ISO 1133 at 190° C. The load under which the measurement is conducted is given as a subscript. Thus, the MFR under the load of 2.16 kg is denoted as $MFR_2$. The melt flow rate $MFR_{21}$ is correspondingly determined at 190° C. under a load of 21.6 kg.

Density

Density of the polymer was measured according to ISO 1183-1:2004 Method A on compression moulded specimen prepared according to EN ISO 1872-2 (February 2007) and is given in $kg/m^3$.

Vicat Softening Temperature

According to ISO 306, method A50, a flat-ended needle loaded with a mass of 10 N is placed in direct contact with an injection moulded test specimen with the dimensions of 80×10×4 mm$^3$. The specimen and needle are heated at 50° C./h. The temperature at which the needle has penetrated to a depth of 1 mm is recorded as the Vicat softening temperature.

Pellet Flow Time

The flow time of polymer pellets was determined in the apparatus as shown in FIG. 2. The silo was filled with pellets and maintained at a predetermined temperature (22° C., 30° C. and 40° C.). After a predetermined time (e.g., 24 hours) the pellets were removed from the silo by opening the cylindrical opening (13) at the bottom and allowing the pellets to flow through the opening. The pellets flowing from the silo through the opening (13) were collected to the container (16) and the weight reading of the balance (17) was recorded as function of time.

Unless otherwise mentioned no other action than opening the bottom outlet (13) was done to facilitate the withdrawal of pellets.

EXAMPLES

In all examples the polymer was a copolymer of ethylene and 1-octene which had been produced in solution polymerisation process in a single polymerisation reactor by using a metallocene catalyst. The polymer had a density of 866 kg/m$^3$ and a melt flow rate MFR$_2$ of 0.5 g/10 min. Further, the polymer had a melting temperature of 53° C. and a Vicat softening temperature of 37° C.

Example 1

The polymer was extruded in ZSK32 MC twin screw extruder supplied by Coperion into the pellet water system as described in FIG. 1. The weight ratio of pellets/water/silica was 1/200/2. Furthermore, the temperature of the incoming pellet water containing 1% by weight of colloidal silica in the water was kept at 18° C. The particle size of the silica was 70 nm. The pH of the pellet water was adjusted to 9. The throughput of the extruder was 60 kg/h and the water flow rate was 12 m$^3$/h. The residence time of the pellets in the pelletiser and the piping before the drier was 13 seconds.

Example 2

The procedure of Example 1 was repeated but the content of the colloidal silica in the pellet water mixture was 0.75% by weight (based on the weight of the water).

Example 3

The procedure of Example 1 was repeated but the content of the colloidal silica in the pellet water mixture was 0.5% by weight (based on the weight of the water).

Comparative Example 1

The procedure of Example 1 was repeated but colloidal silica was not added into the pellet water. Furthermore the pH of the water was not controlled and was about 7.

Example 4

The polymers of Examples 1 to 3 and Comparative Example 1 were subjected to a flow test in the silo of FIG. 2 at 22° C. The results are shown in FIG. 3.

Figure 3:
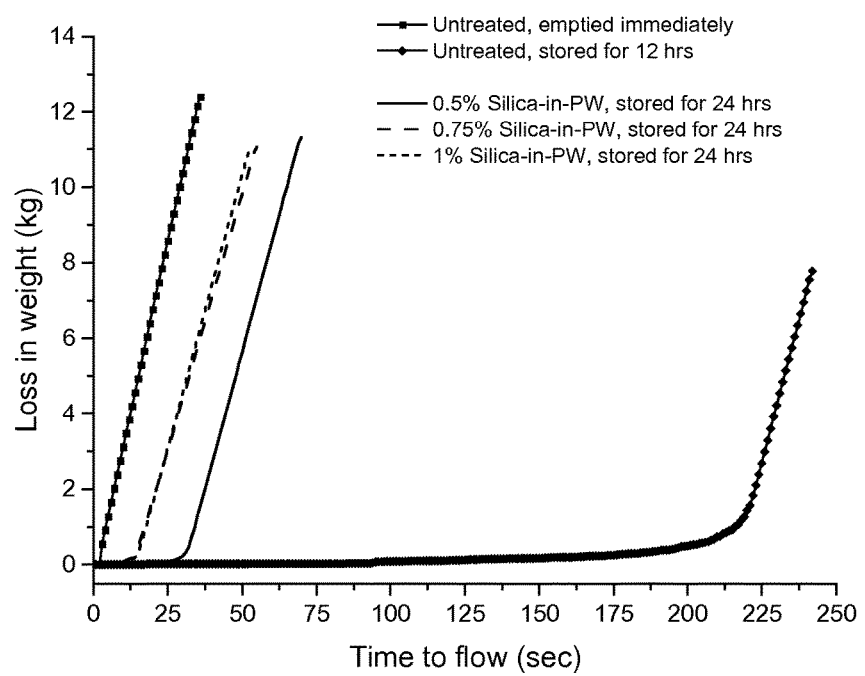
FIG. 3 shows the results of flow experiments conducted at 22° C. storing temperature at different silica concentrations in the pellet water.

In FIG. 3 the amount of material flown out of the silo is shown as a function of time. The figure clearly shows that the untreated pellets are smoothly withdrawn from the silo if it is emptied immediately after filling (the left-most line in the figure). However, the situation changes dramatically if the pellets are aged in the silo for 12 hours at 22° C. (the right-most line). Then it takes more than 200 seconds before any pellets are removed from the silo.

The figure shows the effect of adding colloidal silica into the pellet water. The second line from the right corresponds to Example 3 which had been aged in the silo for 24 hours at 22° C. and the two lines to the left therefrom (the lines are almost overlapping and it may be difficult to see their difference) correspond to Examples 2 and 1, respectively, both of which had been aged in the silo for 24 hours at 22° C.

It can be seen that 10 kg of untreated polymer pellets are withdrawn from the silo in about 25 seconds when the silo is emptied immediately after filling. However, after 12 hour aging the time needed for withdrawing 10 kg is more than 200 seconds.

When colloidal silica was added to the pellet water in amounts of 0.5%, 0.75% and 1% by weight and the pellets were aged in the silo for 24 hours at 22° C., then the time required for withdrawing 10 kg of pellets from the silo was 65 seconds, 52 seconds and 48 seconds, respectively.

Example 5

The polymers of Examples 1 and 2 were subjected to a flow test in the silo of FIG. 2 at 22° C., 30° C. and 40° C. The results are shown in FIG. 4.

Figure 4:
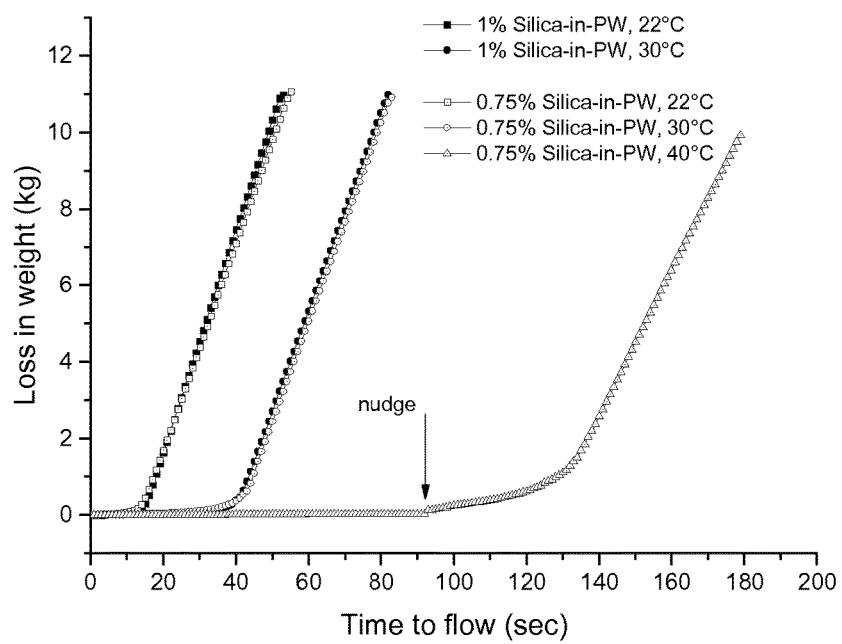
FIG. 4 shows the results of flow experiments conducted at different storing temperatures at silica concentrations of 0.75% and 1.0% by weight in the pellet water.

In FIG. 4 the amount of material flown out of the silo is shown as a function of time. The lines in the figure correspond to contents of 0.75 and 1.0% by weight in the pellet water. The material was aged in the silo at three temperatures, 22° C., 30° C. and 40° C. Aging at 40° C. was done only for the material where the silica content in the pellet water had been 0.75%.

The figure shows that the data for silica contents of 0.75% and 1.0% by weight is practically overlapping. This confirms the observations in Example 4. For aging at 22° C. and 30° C. no significant difference in the emptying time can be seen between the different silica contents. The aging temperature had a significant effect, though.

Thus, for aging at 22° C. the emptying time was about 50 seconds. After aging for 24 hours at 30° C. the emptying time for 10 kg of pellets was about 77 seconds for both silica contents.

When the polymer of Example 2 was aged for 24 hours at 40° C. the silo did not empty. At the time of about 90 seconds the pellets in the silo were nudged through the bottom opening after which the pellets started flowing out. The total emptying time for 10 kg pellets was about 180 seconds (or three minutes; including the 90 seconds time before the nudge).

The invention claimed is:

1. A process for producing pellets from olefin copolymers comprising the steps of: (i) melting the olefin copolymer in an extruder; (ii) extruding the molten olefin copolymer through a die plate having a multitude of holes into a pellet water bath in a pelletiser thereby producing strands of the olefin copolymer and solidifying the strands; (iii) cutting the strands of the olefin copolymer in the pelletiser into pellets; and (iv) drying the pellets, characterised in that the pellet water in the pelletiser contains from 0.5 to 6.0% by weight of a colloidal silica based on the weight of the water, wherein the colloidal silica has a particle size of from 30 to 200 nm and the pH of the pellet water is adjusted within the range of from 6 to 10.

2. The process according to claim 1 comprising the additional steps of: (v) introducing a stream comprising the water and the colloidal silica into the pelletiser; (vi) maintaining a level of the water and the colloidal silica in the pelletiser so that the entire die plate is maintained below the level of the water and the colloidal silica, thereby producing a slurry of the olefin copolymer pellets in the pelletiser; (vii) withdrawing a stream of the slurry of the olefin copolymer pellets from the pelletiser; (viii) passing the stream of the slurry of the olefin copolymer pellets into a dryer; and (ix) recovering from the dryer the pellets comprising the olefin copolymer and silica.

3. The process according to claim 2 comprising the additional steps of: (x) withdrawing a pellet water recycle stream from the drying step; (xi) optionally, adding into the pellet water recycle stream make-up water and make-up colloidal silica; and (xii) passing the pellet water recycle stream into the pelletiser.

4. The process according to claim 1 wherein the pellet water in the pelletiser contains from 0.5 to 3.0% by weight of the colloidal silica based on the weight of the water.

5. The process according to claim 4 wherein the pellet water in the pelletiser contains from 0.6 to 1.5% by weight of the colloidal silica based on the weight of the water.

6. The process according to claim 1 wherein the colloidal silica has a particle size of from 30 to 100 nm.

7. The process according to claim 1 wherein the pH of the pellet water is adjusted within the range of from 8 to 10.

8. The process according to claim 1 comprising an additional step of storing the pellets at a temperature which is not greater than the Vicat softening temperature of the polymer.

9. A process for producing pellets from olefin copolymers comprising the steps of: (i) melting the olefin copolymer in an extruder; (ii) extruding the molten olefin copolymer through a die plate having a multitude of holes into a pellet water bath in a pelletiser thereby producing strands of the olefin copolymer and solidifying the strands; (iii) cutting the strands of the olefin copolymer in the pelletiser into pellets; and (iv) drying the pellets, characterised in that the pellet water in the pelletiser contains from 0.5 to 6.0% by weight of a colloidal silica based on the weight of the water, wherein the colloidal silica has a particle size of from 30 to 200 nm and the pH of the pellet water is adjusted within the range of from 6 to 10, wherein the olefin copolymer is a copolymer of ethylene with one or more comonomers selected from alpha-olefins having from 4 to 10 carbon atoms, and wherein the copolymer has a density of from 856 to 915 kg/m$^3$.

10. A process for producing pellets from olefin copolymers comprising the steps of: (i) melting the olefin copolymer in an extruder; (ii) extruding the molten olefin copolymer through a die plate having a multitude of holes into a pellet water bath in a pelletiser thereby producing strands of the olefin copolymer and solidifying the strands; (iii) cutting the strands of the olefin copolymer in the pelletiser into pellets; and (iv) drying the pellets, characterised in that the pellet water in the pelletiser contains from 0.5 to 6.0% by weight of a colloidal silica based on the weight of the water, wherein the colloidal silica has a particle size of from 30 to 200 nm and the pH of the pellet water is adjusted within the range of from 6 to 10, wherein the olefin copolymer is a copolymer of ethylene with one or more comonomers selected from alpha-olefins having from 4 to 10 carbon atoms, wherein the copolymer has a density of from 856 to 915 kg/m$^3$, and wherein the copolymer of ethylene has a melt flow rate MFR$_2$ of from 0.2 to 50 g/10 min.

11. The process according to claim 9, wherein the copolymer has a density of from 860 to 910 kg/m$^3$.

12. The process according to claim 10, wherein the copolymer of ethylene has a melt flow rate MFR$_2$ of from 0.3 to 30 g/10 min.

* * * * *